US005477021A

United States Patent [19]

Kohlstette et al.

[11] Patent Number: 5,477,021

[45] Date of Patent: Dec. 19, 1995

[54] CENTRIFUGE-DRUM DISK

[75] Inventors: Werner Kohlstette; Walter Tohermes, both of Oelde; Alfons G. Beikel, Vorhelm, all of Germany

[73] Assignee: Westfalia Separator, Oelde, Germany

[21] Appl. No.: 321,666

[22] Filed: Oct. 12, 1994

Related U.S. Application Data

[62] Division of Ser. No. 899,095, Jun. 15, 1992, abandoned, which is a continuation of Ser. No. 648,101, Jan. 31, 1991, abandoned.

[30] Foreign Application Priority Data

Feb. 24, 1990 [DE] Germany .......................... 40 05 898.0

[51] Int. Cl.[6] .......................... B23K 26/00

[52] U.S. Cl. .......................... 219/121.63; 219/121.64; 494/85; 29/DIG. 48; 228/182

[58] Field of Search .......................... 494/85, 50, 67, 494/68, 70, 71, 74; 29/DIG. 48; 228/168, 182; 219/121.63, 121.64, 121.85

[56] References Cited

U.S. PATENT DOCUMENTS

| | | | |
|---|---|---|---|
| 1,293,871 | 2/1919 | Murray | 29/DIG. 48 |
| 1,782,234 | 11/1930 | Hofmann | 29/DIG. 48 |
| 1,851,527 | 3/1932 | Shee | 494/70 |
| 1,853,549 | 4/1932 | Clark | 29/DIG. 48 |
| 2,567,012 | 9/1951 | Donelan | 29/DIG. 48 |
| 3,562,478 | 2/1971 | Bennett | 219/83 |
| 3,836,431 | 9/1974 | Flipot et al. | 219/121.63 |
| 4,792,317 | 12/1988 | Sipsma | 219/82 |
| 5,066,846 | 11/1991 | Pirl | 219/121.63 |

*Primary Examiner*—Mark H. Paschall
*Attorney, Agent, or Firm*—Sprung Horn Kramer & Woods

[57] ABSTRACT

Spacers are roller welded or laser welded to a disk, welding the interstices between the spacers and the disk liquid tight. Nothing can accordingly accumulate in the interstices to contaminate the centrifugate.

1 Claim, 2 Drawing Sheets

CENTRIFUGE-DRUM DISK

This application is a divisional of application Ser. No. 07/899,095 now abandoned, filed Jun. 6, 1991, which is a continuation of application Ser. No. 07/648,101 filed Jan. 31, 1991 and now abandoned.

BACKGROUND OF THE INVENTION

The invention concerns a centrifuge-drum disk, with spacers in the form of strips welded to the top.

Disks of this type are generally known. They are intended to increase the output of the drum. The disks are usually truncated cones, and several are accommodated in a stack inside the drum, with the spacers maintaining a slight gap between each pair. It is within these gaps that the solids are separated from the liquids.

The spacers are spot welded to known disks. This process leaves interstices between the disk and the spacer that extend from one weld to the next. Liquids and solids can penetrate into these interstices and are difficult to eliminate by the conventional cyclic chemical rinsing.

Interstices that are not absolutely clean can in particular contaminate any products that are clarified between the disks and must satisfy high purity standards. This is especially true of the biotechnology field. Again, when a processing line is switched over to another product, the latter can be detrimentally affected by residue from the previous product if the system is inadequately rinsed, and thorough cleaning of the interstices between the disks and the spacers is impossible even when the drum and its components are disassembled and scrubbed.

SUMMARY OF THE INVENTION

The object of the present invention is accordingly to secure spacers to the centrifuge-drum disk in such a way as to prevent solids from accumulating between the strips and the disk.

This object is attained in accordance with the present invention by welding the interstices between the spacers and the disks liquid tight.

It is surprisingly possible to weld the interstices liquid tight without impermissibly deforming the disk.

In one preferred embodiment of the invention only the edges of the spacers are integrally welded to the disks, and the midline of their base is left unwelded. This approach maintains the desired thickness of the spacers, at least in the unwelded areas.

One method of manufacturing the disks is characterized in that the spacers are roller welded to them.

The welding roller travels over the spacers toward the circumference of the disk in one advantageous embodiment of the method. The power is simultaneously varied to produce a solid weld at each end of a strip and to weld only the edges of the rest of the strip. Since the roller is narrower than the bracket is long, most of the surface of the strip will be unaffected by welding.

The spacers are laser welded to the disks in another method. This approach will maintain the spacers at the desired thickness throughout their area.

The invention will now be described with reference to the drawings, wherein

DETAILED DESCRIPTION OF THE INVENTION

Figure 1:
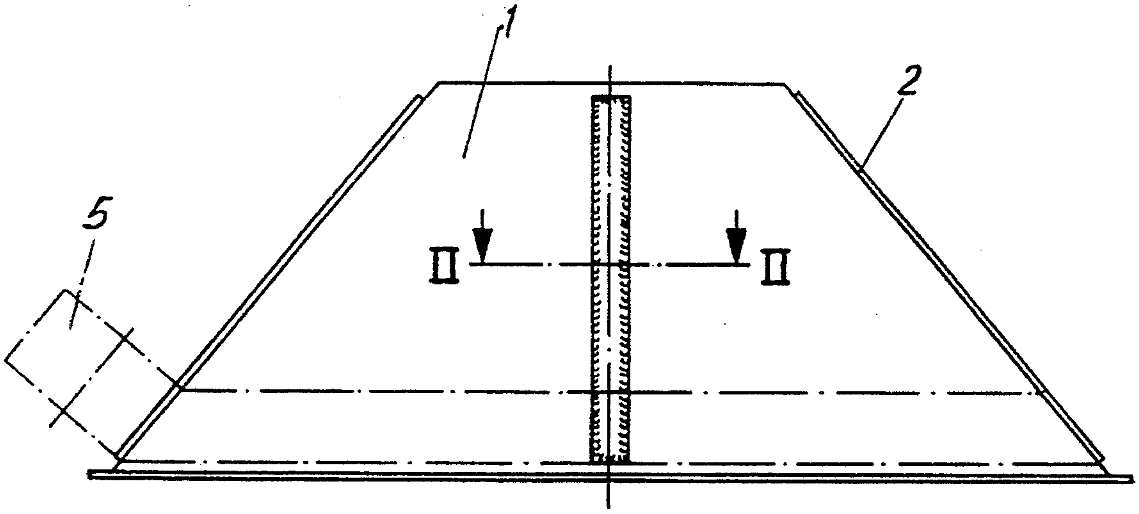
FIG. 1 illustrates a disk with spacers which are roller welded to it.

The disk 1 illustrated in FIG. 1 has spacers 2 on the top. As will be evident from FIG. 2, there is an interstice 3 between each spacer 2 and its associated disk 1 at the continuous edges 4 of the spacer. Interstices 3 are initially exposed to the atmosphere.

Figure 2:
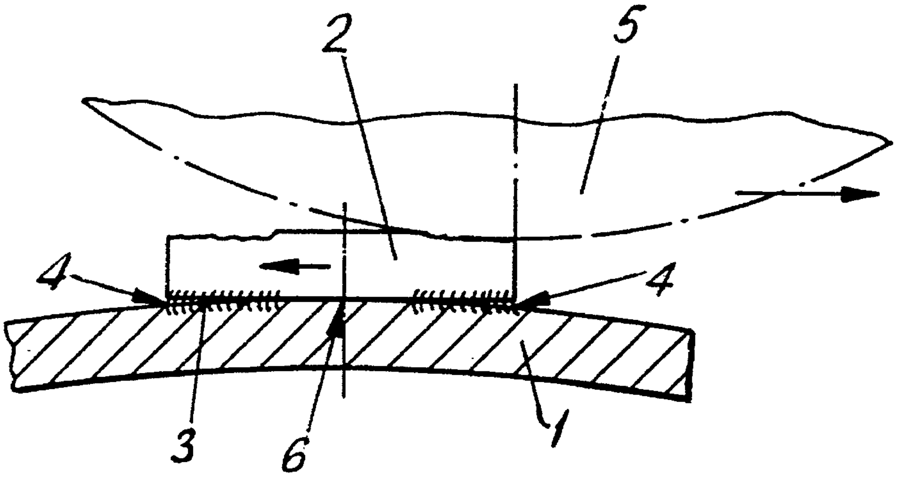
FIG. 2 is a section along the line II–II in FIG. 1.

Spacers 2 can be welded to disk 1 as illustrated in FIGS. 1 and 2 with the roller 5 of an unillustrated machine. Roller 5 travels over spacers 2 toward the circumference of disk 1, welding interstices 3 tight. The welding process also slightly softens the surface of spacers 2. The power is adjusted to produce a solid weld at each end of a spacer 2 while welding the rest of it only along edges 4. No welding accordingly takes place along midline 6 within the circumference of the spacers 2. Since the roller is narrower than the bracket is long, most of the surface of the spacers will be unwelded, and they will be at their intended thickness, at least in that area.

Figure 3:
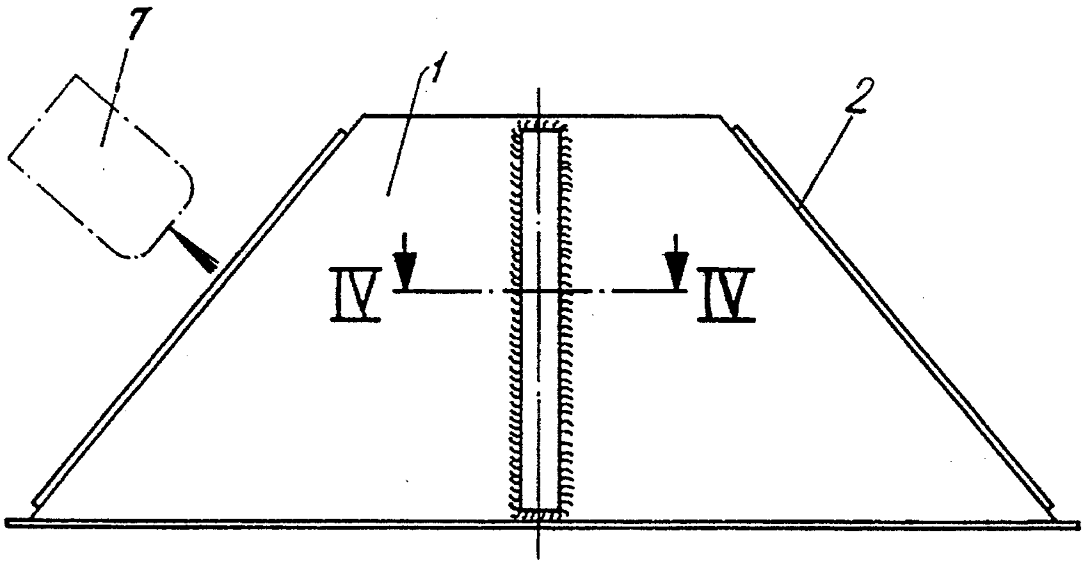
FIG. 3 illustrates a disk spacers with which are laser welded to it.
Figure 4:
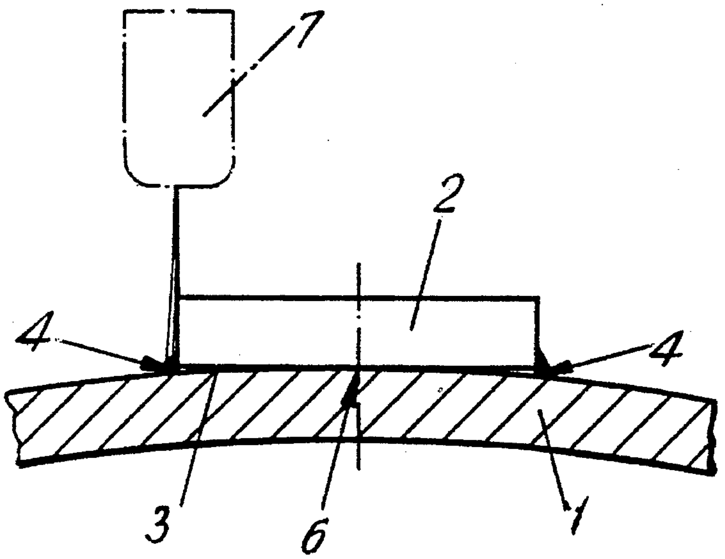
FIG. 4 is a section along the line IV–IV in FIG. 3.

Spacers 2 can however also be laser welded to disk 1 as illustrated in FIG. 3, which represents a laser head traveling along the continuous edges 4 of spacers 2 with its beam 8 welding interstice 3 liquid tight. This approach leaves the whole spacer 2 at its desired thickness.

What is claimed is:

1. A method of producing a centrifuge drum disk comprising the steps of: forming spacers from strips, each having circumferential edges; providing a drum disk with an outer surface; connecting the spacer strips to the outer surface of the disk at a tip portion thereof by laser beam welding each spacer strip solely along all of the circumferential edges thereof to produce a liquid tight weld with a midline of a base thereof left unwelded, whereby accumulations between the strip and the outer surface of the disk are prevented.

* * * * *